(12) United States Patent
Morioka

(10) Patent No.: US 10,397,967 B2
(45) Date of Patent: Aug. 27, 2019

(54) COMMUNICATIONS DEVICE

(71) Applicant: SONY CORPORATION, Tokyo (JP)

(72) Inventor: Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/038,911

(22) PCT Filed: Dec. 23, 2014

(86) PCT No.: PCT/EP2014/079174
§ 371 (c)(1),
(2) Date: May 24, 2016

(87) PCT Pub. No.: WO2015/110243
PCT Pub. Date: Jul. 30, 2015

(65) Prior Publication Data
US 2017/0164272 A1 Jun. 8, 2017

(30) Foreign Application Priority Data
Jan. 24, 2014 (EP) ..................................... 14152430

(51) Int. Cl.
*H04W 48/16* (2009.01)
*H04W 72/04* (2009.01)
(Continued)

(52) U.S. Cl.
CPC ............ *H04W 76/11* (2018.02); *H04W 48/16* (2013.01); *H04W 72/0406* (2013.01);
(Continued)

(58) Field of Classification Search
CPC ... H04W 76/023; H04W 8/005; H04W 92/18; H04W 48/16; H04W 76/046; H04W 92/02; H04W 4/08
See application file for complete search history.

(56) References Cited

U.S. PATENT DOCUMENTS

| 2012/0134344 A1 | 5/2012 | Yu et al. |
| 2013/0150061 A1* | 6/2013 | Shin ........................ H04W 4/70 455/450 |

(Continued)

FOREIGN PATENT DOCUMENTS

| EP | 2 688 226 A2 | 1/2014 |
| WO | WO 2014/008067 A1 | 1/2014 |

OTHER PUBLICATIONS

International Search Report dated Apr. 10, 2015 in PCT/EP2014/079174 filed Dec. 23, 2014.

(Continued)

*Primary Examiner* — Margaret G Mastrodonato
(74) *Attorney, Agent, or Firm* — Xsensus LLP

(57) ABSTRACT

A first communications device is operable to transmit device-to-device communications to a second communications device using a wireless access interface of a wireless telecommunications system, access to the wireless access interface being coordinated by a coordinating entity. The first communications device comprises a controller and a transceiver, the controller being configured in combination with the transceiver to receive from the coordinating entity an indication of an identifier associated with a device-to-device communications link between the first and second communications devices, to transmit to the coordinating entity a message requesting resources of the wireless access interface for transmitting data across the device-to-device communications link, to receive from the coordinating entity an indication of a resource allocation of the wireless access interface associated with the identifier, and to transmit the data to the second communications device using the allocated resources.

20 Claims, 8 Drawing Sheets

(51) Int. Cl.
*H04W 76/11* (2018.01)
*H04W 76/14* (2018.01)
*H04W 76/27* (2018.01)
*H04W 92/02* (2009.01)
*H04W 92/18* (2009.01)

(52) U.S. Cl.
CPC ........... *H04W 76/27* (2018.02); *H04W 92/02* (2013.01); *H04W 92/18* (2013.01); *H04W 76/14* (2018.02)

(56) References Cited

U.S. PATENT DOCUMENTS

| | | | |
|---|---|---|---|
| 2013/0322413 A1* | 12/2013 | Pelletier | H04W 72/1289 370/336 |
| 2014/0003239 A1 | 1/2014 | Etemad et al. | |
| 2014/0003240 A1 | 1/2014 | Chen et al. | |
| 2014/0003262 A1 | 1/2014 | He et al. | |
| 2014/0003302 A1 | 1/2014 | Han et al. | |
| 2014/0003312 A1 | 1/2014 | Sergeyev et al. | |
| 2014/0003313 A1 | 1/2014 | Jain et al. | |
| 2014/0003319 A1 | 1/2014 | Etemad et al. | |
| 2014/0003339 A1 | 1/2014 | Jain et al. | |
| 2014/0003358 A1 | 1/2014 | Elliott | |
| 2014/0023008 A1 | 1/2014 | Ahn et al. | |
| 2014/0064203 A1 | 3/2014 | Seo et al. | |
| 2014/0301217 A1 | 10/2014 | Choi et al. | |
| 2015/0049650 A1 | 2/2015 | Choi | |

OTHER PUBLICATIONS

Harri Holma, et al. "Basic System Architecture Configuration with only E-UTRAN Access Network" LTE for UMTS Of DMA and SC-FDMA Based Radio Access, 2009, pp. 25-27 and cover page.

* cited by examiner

COMMUNICATIONS DEVICE

CROSS REFERENCE TO RELATED APPLICATIONS

The present application claims priority to European Patent Application 14 1552 430.6 filed in the European Patent Office on 24 Jan. 2014, the entire contents of which being incorporated herein by reference.

FIELD OF THE DISCLOSURE

The present disclosure relates to wireless telecommunications systems and in particular to systems and methods for performing device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications has been introduced. D2D communications allow communications devices that are in close proximity to directly communicate with each other, both when within and when outside of a coverage area. This D2D communications ability may allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area. Fourth generation networks have therefore been proposed as a cost effective solution to public safety communications compared to dedicated systems such as TETRA which are currently used throughout the world.

However, the potential coexistence of conventional LTE communications and D2D communications within a single coverage area or network may increase the complexity of coordinating communications and resource allocation within an LTE network, and may also lead to potential compatibility issues between conventional and D2D capable LTE communications devices.

SUMMARY OF THE DISCLOSURE

In accordance with an example of the present disclosure there is provided a first communications device operable to transmit device-to-device communications to a second communications device using a wireless access interface of a wireless telecommunications system, access to the wireless access interface being coordinated by a coordinating entity. The first communications device comprises a controller and a transceiver, the controller being configured in combination with the transceiver to receive from the coordinating entity an indication of an identifier associated with a device-to-device communications link between the first and second communications devices, to transmit to the coordinating entity a message requesting resources of the wireless access interface for transmitting data across the device-to-device communications link, to receive from the coordinating entity an indication of a resource allocation of the wireless access interface associated with the identifier, and to transmit the data to the second communications device using the allocated resources.

Device-to-device communications may be implemented in communications systems such as those that operate in accordance with the 3GPP LTE standard. Conventionally user data and control data are communicated via a coordinating entity such as an enhanced node B (eNodeB), however device-to-device (D2D) communications may also take place in which user data is directly communicated between communications devices but it is likely that not all communications devices of such a system will be capable of performing D2D communications. Consequently, it is desirable that D2D communications are substantially transparent to non-D2D capable devices such that backwards compatibility is maintained in the system. In accordance with the present disclosure, by associating an identifier with a D2D link the setup and resource allocation associated with the link may be performed in manner that corresponds to conventional resource allocation in an LTE system, where an indication of the identifier is included with resource requests and resource allocations. In this manner the likelihood of the D2D resource allocation procedure interfering with non-D2D capable communications devices can be reduced. The use of an identifier also allows the transmitting and receiving communications devices to be informed of resource allocations in a corresponding manner to communications devices in a conventional LTE system. Consequently, receiving communications devices may avoid having to perform a blind search of resources in order to receive a D2D transmission because they are given an indication of a specific set of resource in which to receive the data. By avoiding a blind search energy savings may be achieved at the receiving communications device. Furthermore, by using such an identifier, the D2D communication link establishment and resource request may be performed in a similar manner to that for a communications device wishing to perform conventional LTE communications, consequently existing resource allocation procedures may be used at the coordinating entity and the first communications device for the allocation of resources to D2D links.

In accordance with another example the controller is configured in combination with the transceiver to transmit to the coordinating entity a message requesting an identifier to be associated with a device-to-device communications link with the second communications device.

The transmission of a D2D link request allows a communications device to initiate the establishment of a D2D link, and therefore a communications device may autonomously determine the need to form a D2D link. The transmission from the communications device and the reception at the coordinating entity of a request message also correspond to the process which occurs when a communications device first wishes to establish a link with a coordinating entity in an LTE system. Consequently, existing identifier association techniques may be used at the first communications device and the coordinating device thus simplifying the coordination of D2D communications in an LTE system.

In accordance with another example the message requesting resources of the wireless access interface for transmitting data across the communications link includes an indication of the identifier.

The inclusion of an indication of the identifier in the resource request enables the resource request procedure to correspond to the procedure that occurs when communications devices issue conventional resource request messages in an LTE system. Consequently, procedures corresponding to those used in conventional LTE resource allocation may be used at the first communications device with little amendment for the allocation of resources to D2D links. Furthermore, the inclusion of an indication of the identifier may also allow the coordinating entity to quickly and efficiently identify that a resource request message corresponds to the D2D link.

In accordance with another example the identifier is associated with a one-way device-to-device communications link from the first communications device to the second communications device.

The association of identifiers to one-way D2D links means that the receiving and transmitting communications devices are not required to be specified in a resource request message by virtue of there being only one transmitting device associated with the link. This may therefore reduce the overheads of the resource request messages and avoid the need for devices receiving a resource allocation to establish whether it is transmitting or receiving data using the allocated resources.

In accordance with another example the identifier associated with the device-to-device communications link has a format corresponding to a format for identifying communications devices in the wireless telecommunications system.

The use of such an identifier format allows the D2D link to be treated as if it were a conventional communications device in a system, thus making the D2D resource allocation and transmission procedure transparent to legacy communications devices which are not capable of D2D communications. The use of such identifiers may also allow the first communications devices and the coordinating entity to use the principles of existing resource allocation procedures for D2D link thus simplifying the control of D2D links. This in turn further reduces the likelihood of compatibility problems arising between D2D capable and legacy devices.

In accordance with another example the first communications device is operable to transmit device-to-device communications to a plurality of second communications devices and the controller is configured in combination with the transceiver to receive from the coordinating entity an indication of an identifier associated with a plurality of device-to-device communications links between the first communications device and respective ones of the plurality of second communications devices.

The use of one-to-many D2D links allows the first communications device to transmit common data to multiple D2D devices without having to establish a separate D2D link with each device. Accordingly, this both simplifies the process of communicating common data but also reduces the resources and power required to transmit the data compared to using only one-to-one D2D link. Furthermore, by virtue of the one-to-many link having single transmitting device, little additional signaling is required in the resource allocation process because a common resource allocation message associated with the identifier and therefore the one-to-many D2D link can be sent to the relevant communications devices.

In accordance with another example the coordinating entity is a communications device operable to perform device-to-device communications.

The use of a D2D device as a coordinating entity allows the D2D communications to be performed when the participating devices are outside of a coverage area of an eNodeB. This therefore allows the D2D link establishment and resource allocation process to be used in an out of coverage situation that may occur for example when D2D communications are used for public safety applications.

In accordance with another example the identifier associated with the communications link is a member of a predetermined group of identifiers reserved for association with device-to-device communications links.

The specification of a group of D2D identifiers allows the coordinating device to quickly and simply identify messages and requests associated with a D2D link and therefore prioritise the resource allocation accordingly. It may also allow communications devices to quickly and efficiently recognise that an identifier relates to a D2D link.

In accordance with another example the controller is configured in combination with the transceiver to receive an indication of a preamble associated with the identifier from the coordinating entity, and to transmit the message requesting resources in association with the preamble.

By associating a preamble with the identifier and receiving an indication of the preamble at the first communications device, the first communications device may transmit the preamble in association with a resource request message and therefore avoid the need to provide an explicit indication of the identifier and/or D2D link in the resource request message data itself. Furthermore, the use of a preamble may allow the above described resource request procedure to be performed in a similar manner to a conventional LTE resource request from a communications device, thus simplifying the operation of the first communications device and the coordinating entity when the above procedure is implemented in an LTE system.

In accordance with another example the controller is configured in combination with the transceiver to receive from the coordinating entity an indication of an uplink control channel resource of the wireless access interface associated with the identifier, and to transmit the message requesting resources in the uplink control channel resource.

By associating a dedicated uplink resource with the identifier and receiving an indication of the dedicated uplink resource at the first communications device, the first communications device may transmit the resource request message in the dedicated resources and therefore avoid the need to provide an explicit indication of the identifier and/or D2D link in the resource request message data itself. Furthermore, the use of a dedicated resource may also allow the above resource request procedure to be performed in a similar manner to a conventional LTE resource request from a communications device, thus simplifying the operation of the first communications device and coordinating entity.

Various further aspects and embodiments of the disclosure are provided in the appended claims, including but not limited to coordinating entities, communications devices, wireless communications systems and methods of performing device-to-device communications.

BRIEF DESCRIPTION OF THE DRAWINGS

Embodiments of the present disclosure will now be described by way of example only with reference to the accompanying drawings, in which like parts are provided with corresponding reference numerals and in which.

DETAILED DESCRIPTION OF EXAMPLE EMBODIMENTS

Conventional Communications System

Figure 1:
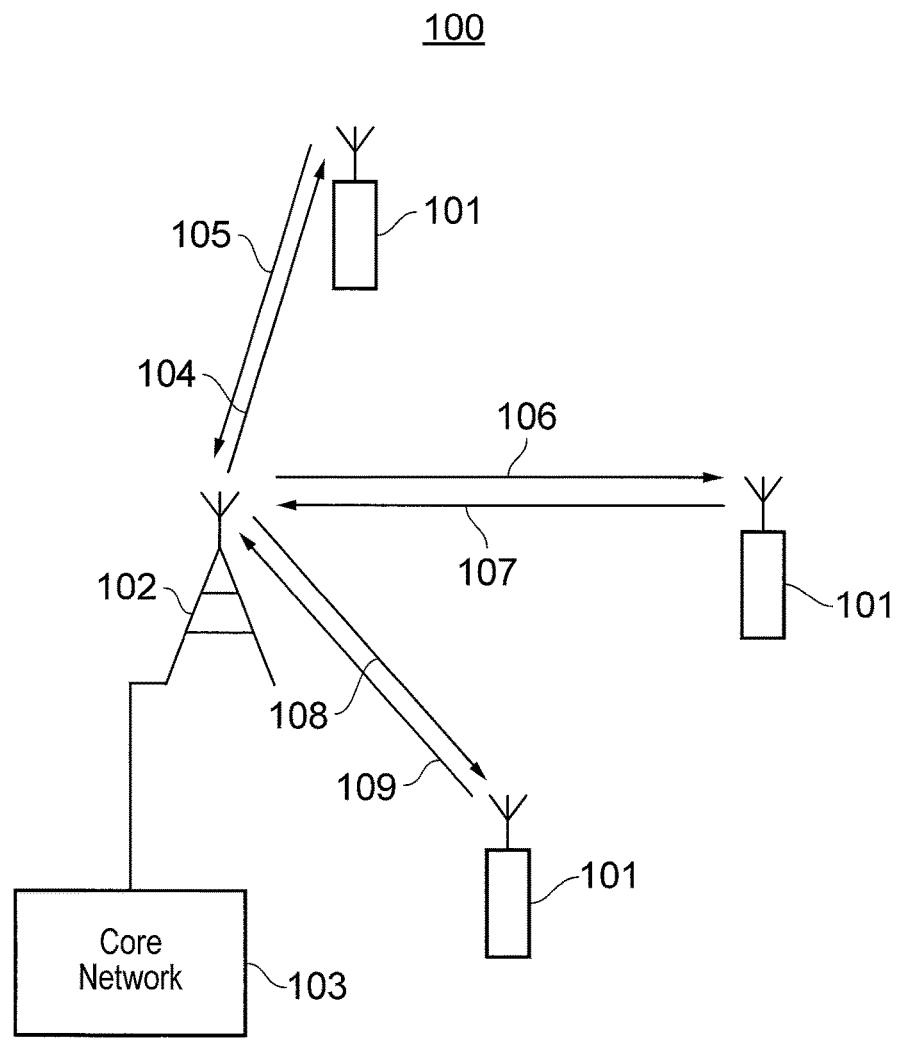
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network is connected to one or more other communications networks and may provide functionality including authentication, mobility management, charging and so on for the communications devices served by the network entity. The mobile communications devices may also be referred to as communications terminals, user equipment (UE), terminal devices and so forth, and are configured to communicate with one or more other communications devices via the network entity by transmitting and receiving data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
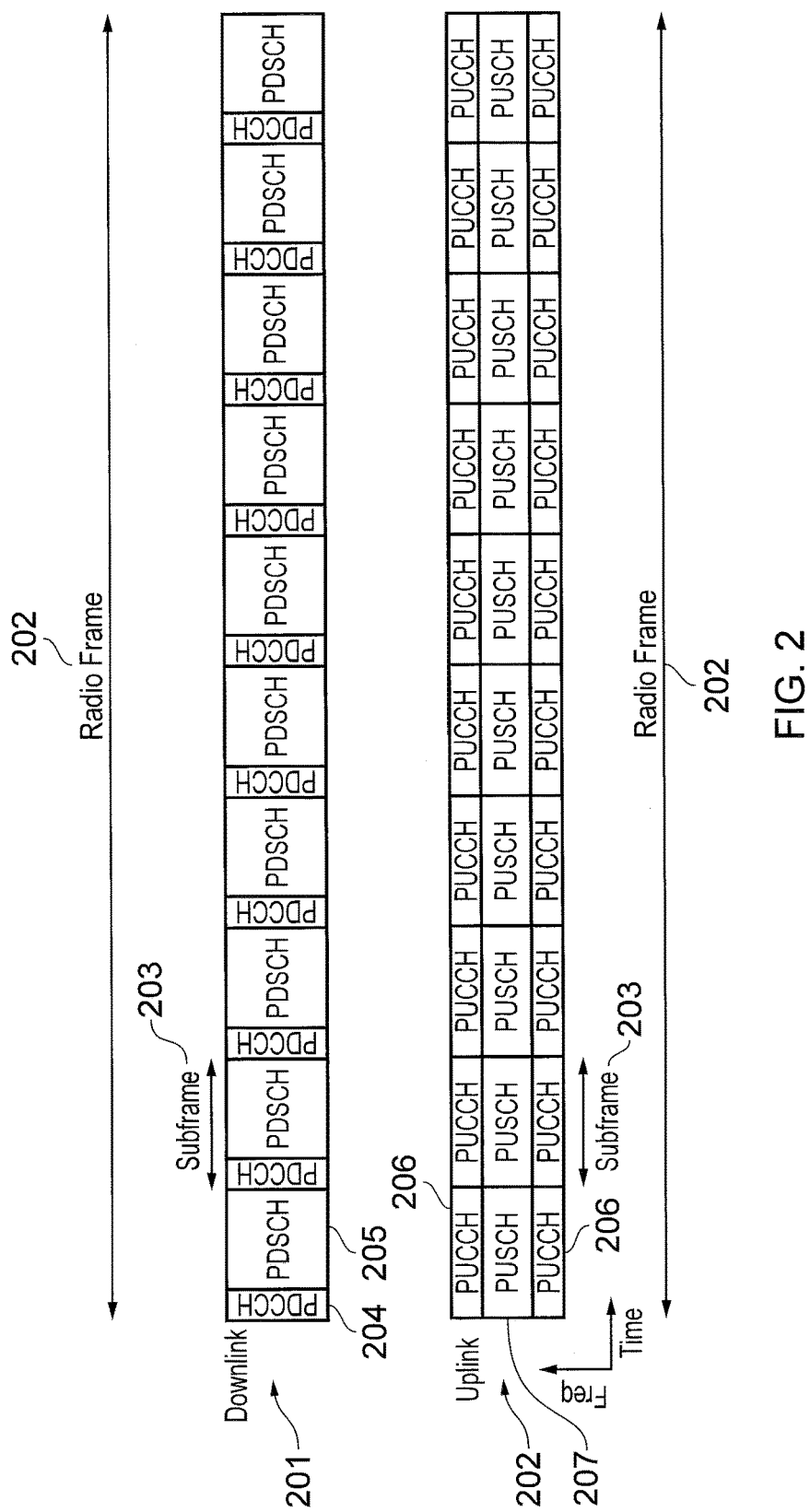
FIG. 2 provides a schematic diagram of the structure of a downlink and of an uplink of a wireless access interface of a mobile communications system.

FIG. 2 provides a simplified schematic diagram of the structure of a downlink 200 and of an uplink 201 of the wireless access interface that may be provided by the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface and the wireless access interface of the uplink from a UE to an eNodeB is based upon a single carrier frequency division multiple access (SC-FDMA) radio interface. In these radio interfaces the bandwidth of the available resources are divided into a plurality of orthogonal subcarriers and data is transmitted on the uplink and on the downlink on the plurality of orthogonal subcarriers, where for example a 20 MHz bandwidth may be divided in 1200 orthogonal subcarriers. As shown in FIG. 2, the resources of the wireless access interface are also temporally divided into frames where a frame 202 last 10 ms and is subdivided into 10 subframes 203 each with a duration of inns. Although not shown in FIG. 2 each subframe may be further divided in time into two slots where each slots comprises a number of OFDM symbols, which in some examples may be six or seven. The resources within a slot may then be divided into resources blocks each comprising 12 subcarriers for the duration of one slot and the resources blocks further divided into resource elements which span one subcarrier for one OFDM symbol.

In the simplified structure of the downlink of an LTE wireless access interface of FIG. 2, each subframe 203 comprises a control region 204 and a data region 205. The control region 204 may contain a number of physical channels such as a physical downlink control channel (PDCCH), a physical control format indicator channel (PCFICH) and a physical HARQ indicator channel (PHICH) and the data region may contain physical channels such as a physical downlink shared channel (PDSCH), a physical broadcast channels (PBCH) as well as synchronisation signals. However, although all such channels are required for correct functioning of an LTE system, in terms of downlink communications the PDCCH and the PDSCH are most relevant to the present disclosure and therefore discussion of the structure of the LTE subframes will be predominantly limited to these channels. However, further information on the structure and functioning of the physical channels of LTE systems can be found in [1]. Resources within the PDSCH may be allocated by a serving eNodeB to any UE being served by the eNodeB. For example a number of resource blocks of the PDSCH may be allocated to a UE in order that it may receive data that it has previously requested or data which is being pushed to it by the eNodeB such as radio resource control (RRC) signalling. A UE may be allocated a fraction of the available resources of the PDSCH and therefore UEs are required to be informed of the location of their allocated resources within the PDCSH so that only relevant data within the PDSCH is detected and estimated by a UE. In order to achieve this, resource control information specifying downlink resource allocations is conveyed across the PDCCH in a form termed downlink control information (DCI), where resource allocations for a PDSCH are communicated in a preceding PDCCH instance. In LTE a number of different DCI formats exist, each intended to convey a different type of control data. For example, DCI Formats 1 and 2 are used to inform UEs of their PDSCH allocations and format 0 is used to inform UEs of their uplink allocations. Uplink resource allocations and controlling signalling are discussed in more detail below.

Regardless of the format of a DCI, they are transmitted and received in a common manner. When a UE first establishes an RRC connection with an eNodeB it is allocated, among others identifiers, a unique cell radio network temporary identifier (C-RNTI). The identifier is then used in communications with the serving eNodeB in order to identify the UE, resource allocations and data intended for the UE. DCIs are accompanied by a cyclical redundancy check (CRC) and it is these which act to differentiate DCI for different UEs. The CRC of each DCI is scrambled with the C-RNTI of the UE for which the DCI is intended and UEs are configured to monitor the PDCCH and extract data from DCIs whose CRC they can correctly descrambled. In this manner each UE can identify a DCI intended for them and extract the resource allocation data within. For example, for the allocation of resources in a PDSCH for a first UE, a preceding PDCCH will contain a DCI whose CRC has been scrambled with the C-RNTI of the first UE. The first UE will then detect the appropriate DCI via CRC descrambling, extract the resource allocation information and receive the data in the resources of the PDSCH specified in the DCI. A second UE which has a different C-RNTI would not be able to correctly descramble the CRC of the DCI intended for the first UE and therefore will not attempt to receive the data located in the PDSCH resources allocated to the first UE.

In the simplified structure of the uplink 201 of the wireless access interface, each subframe comprises one or more control regions 206, which include a physical uplink control channel (PUCCH), and a data region 207, which includes a physical uplink shared channel (PUSCH). The uplink control and data regions may also include additional physical channels and signals such as reference signals but the PUCCH and the PUSCH are most relevant for the present disclosure and therefore the discussion of physical uplink channel will be predominantly limited to these channels. However, further information on the structure and functioning of the physical channels of LTE systems can be found in [1]. In an analogous manner to the PDSCH, resources of the PUSCH are required to be scheduled by the serving eNodeB and therefore if data is to be transmitted by a UE, resources of the PUSCH are required to be allocated to the UE. Such allocation is achieved by the transmission of a scheduling request from a UE to its serving eNodeB. The scheduling request may be made via the transmission of Uplink Control Information (UCI) on the PUCCH and then in a resulting PUSCH allocation when there is no existing PUSCH allocation for the UE, or by transmission directly on the PUSCH when there is an existing PUSCH allocation for the UE. As for DCI, UCI may take a number of formats depending on the content of the UCI, where for PUSCH scheduling requests format 1 is used. In response to a scheduling request, the eNodeB is configured to allocate a portion of the PUSCH resource to the requesting UE and then inform the UE of the resource allocation via a DCI in the PDCCH. For example, presuming a UE is connected to the eNodeB, the UE will first transmit a PUSCH resource request in the PUCCH in the form of a UCI. The UE will then monitor the PDCCH for DCI whose CRC is scrambled with its C-RNTI. Once such a relevant DCI has been detected the UE will then extract the PUSCH scheduling information and transmit its data in the appropriate resources of the PUSCH.

As a result of the above described operation one or more UEs may communicate data to one another via a coordinating eNodeB, thus forming a conventional cellular telecommunications system. Although cellular communications system such as those based on the previously released LTE standards have been commercially successful, a number of disadvantages are associated with such a centralised system. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly.

Device-to-Device Communications

Figure 3:
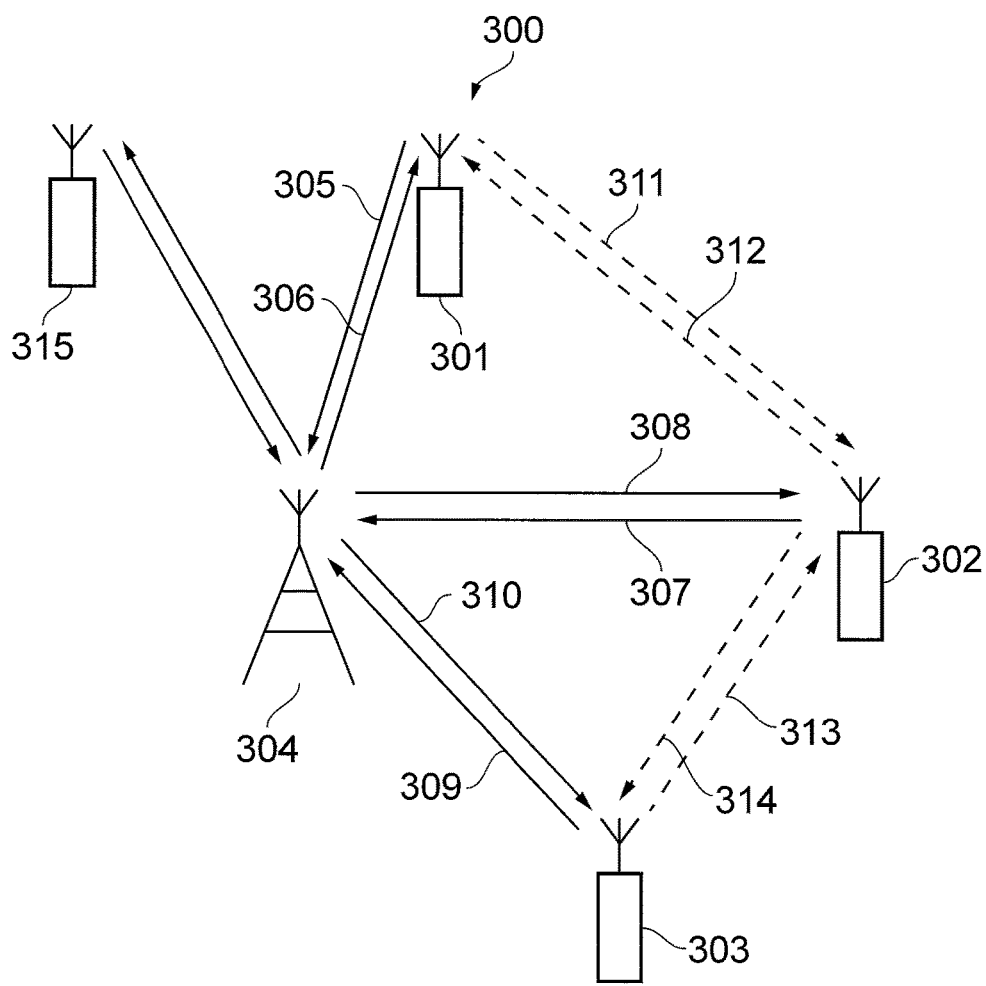
FIG. 3 provides a schematic diagram of a mobile communications system in which communications devices are operable to perform device-to-device communications.

FIG. 3 provides a schematic diagram of a mobile communications system 300 that is substantially similar to that described with reference to FIG. 1 but where the UEs 301 302 303 are also operable to perform direct device-to-device (D2D) communications with one another and UE 315 is only capable of performing conventional cellular communications with the eNodeB 304. D2D communications comprise UEs directly communicating data between one another without user and or control data being communicated via a dedicated coordinating entity such as an eNodeB. For example, in FIG. 3 communications between the UEs 301 302 303 315 and the eNodeB 304 are in accordance with the existing LTE standard, but as well as communicating via the uplink and downlinks 305 to 310, when the UEs 301 to 303 are within range of each other they may also to communicate directly with one another via the D2D communication links 311 to 314. In FIG. 3 D2D communications links are indicated by dashed lines and are shown to exist between 301 and 302, and 302 and 303 but not between 301 and 303 because these UEs are not sufficiently close together to directly transmit and receive signals to from one another. D2D communications links are also shown not to exist between 315 and other UEs because UE 315 is not capable of D2D communications. A situation such as that illustrated in FIG. 3 may exist in an LTE network where D2D communications are implemented in a later release of LTE and UE 315 is a legacy device not compliant with a most recent LTE release.

A number of possible implementations of D2D communications exist, for example in LTE networks the wireless access interface provided for communications between UEs and eNodeB may be used for D2D communications, where the eNodeB allocates the required resources and control signaling is communicated via the eNodeB but user data is transmitted directly between UEs. In another example, UEs may communicate directly with each other by negotiating access to a wireless access interface directly, although they are still also operable to communicate with a serving eNodeB. In yet another example a selected D2D capable UE from a group of D2D capable UEs may act as a coordinating entity and allocate resources of a wireless access interface to D2D capable UEs within its sphere of influence or coverage area. The wireless access interface utilised for D2D communications may be provided in accordance with any of a number of techniques such as carrier sense multiple access (CSMA), OFDM or a combination thereof for example as well as an OFDM/SC-FDMA 3GPP LTE based wireless access interface. Although in the foregoing description D2D communications are described with reference to an LTE system with an eNodeB controlling resource allocation, the presently disclosed techniques are equally applicable to other LTE system structures and other systems which are compatible with D2D communications.

Figure 4:
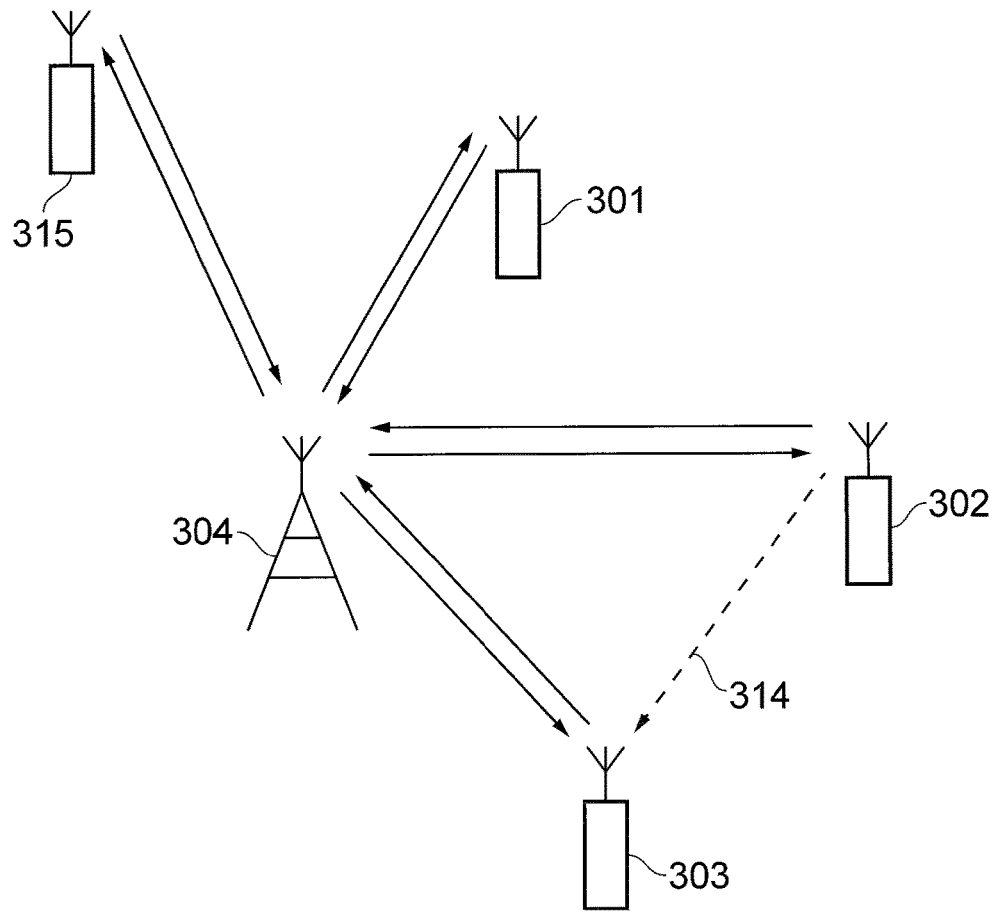
FIG. 4 provides a schematic diagram of a mobile communications system in which communications devices are operable to perform device-to-device communications.

FIG. 4 provides a schematic diagram of a communications system in which UE 302 wishes to establish a one-way D2D communications link 314 with UE 303. In order to establish a D2D communications link a number of steps are required to be performed. Firstly, it is necessary for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 301 may discover UE 302, UE 302 may discover UEs 301 and 303, and UE 303 may discover UE 302. Once UE 302 is aware of the existence of UE 303 it may then proceed to establishing a D2D communications link with UE 303. This process is described in more detail below.

Once a D2D communications link is established resources of the wireless access interface are required to be allocated to the D2D link. It has been previously proposed that in LTE systems that D2D transmission are performed in the PUSCH such that D2D transmissions appear to be conventional uplink transmissions, although in such a case a receiving UE will be required to be configured to receive data from an uplink channel. D2D transmissions may also be scheduled in other physical channels such as the PDSCH, however, this requires the transmitting UE to transmit when it would conventionally be receiving data. Consequently, the reception of data and control signaling transmitted within the data region may be adversely affected.

In order to establish a D2D communications link, both the transmitting and intended recipient UEs are required to have knowledge of the link. This is also true of the eNodeB itself as it requires a means by which it can identify the D2D communications link and schedule D2D communications within the resources of the wireless access interface without disrupting communications between other UEs. To accomplish D2D communications in such situations, coordination is required between the UEs wishing the preform D2D communications and the serving eNodeB so that multiple UEs do not attempt to utilise a same set of resources. Furthermore, because D2D communications may coexist with conventional communications within a system, it is also desirable that D2D resource allocations and transmissions do not interfere and are transparent to legacy UEs so any adverse effects on legacy UEs are reduced. Consequently, an efficient D2D communication link setup and resource allocation procedure that is substantially transparent to legacy UEs is desirable.

D2D Link Identification

In accordance with the present disclosure it is proposed that each D2D communications link within a system, D2D group, or coverage area is allocated a unique identifier such it may be treated as and may appear to be a conventional UE with regards to establishment and resource allocation. D2D resource allocation and link setup may then appear transparent to non-D2D capable UEs and thus be compatible with existing resource allocation procedures. Such an approach is described below.

Figure 5:
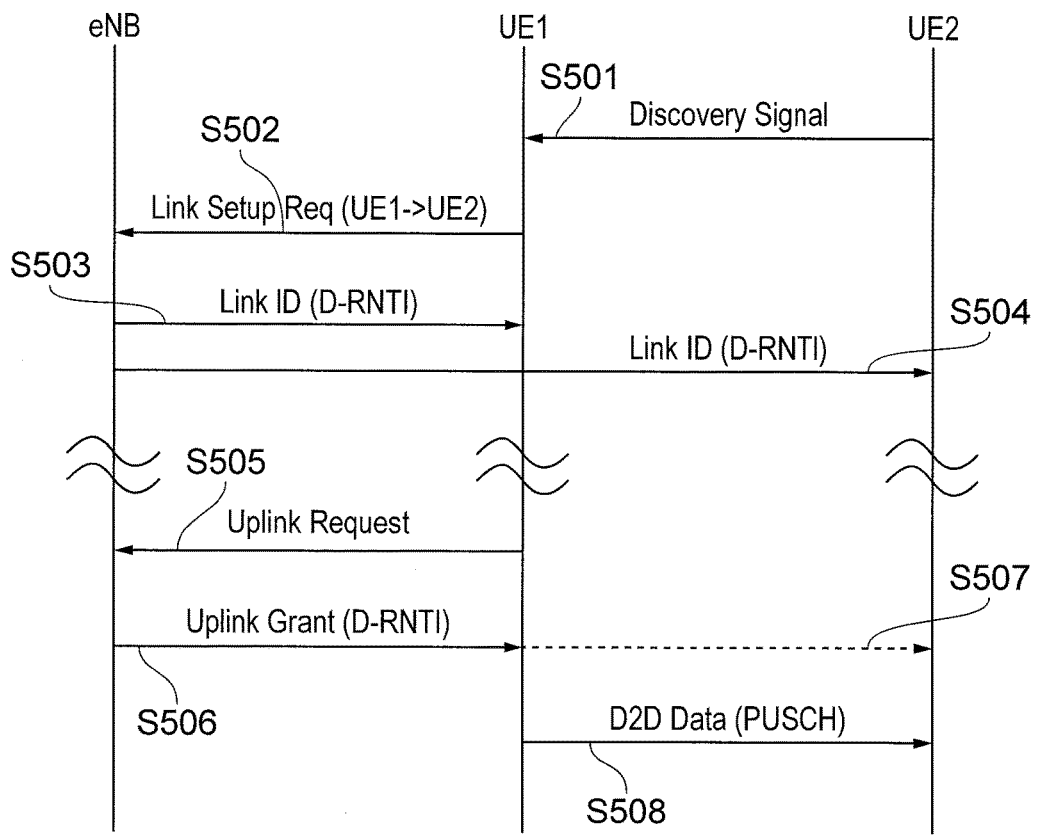
FIG. 5 provides a schematic diagram of a device-to-device communications link establishment routine.

FIG. 5 provides a schematic diagram of example communication steps that may take place in the system of FIG. 4 between UE 302 (UE1), UE 303 (UE2) and eNodeB 304 when UE1 wishes to establish a D2D communications link 314 with UE2.

S501

Firstly, the discovery signal of UE2 is received at UE1 and UE1 determines that it wishes to perform a D2D transmission to UE2.

S502

UE1 then proceeds to transmit a one-way D2D link setup request to the eNodeB where the request includes an indication of the identity of the receiving UE (UE2) but also its own identity, although in some examples the identity of UE1 may be inherently included in the request message. The link setup request may be transmitted in any uplink resources available to UE1, for example in the PUCCH or PUSCH, where a new UCI format may be defined for D2D link setup requests so that the eNodeB can easily and efficiently identify D2D related requests.

S503, S504

Once a link setup request has been received at the eNodeB, the eNodeB allocates or associates a unique identifier to the link that may be used to identify the link in future communications. The unique identifier may take any appropriate form but it may be advantageous if it were to be compatible with existing identifiers used within the system such that existing devices are not adversely affected by the presence of the identifier. Furthermore, use of such an identifier may also allow the system and or eNodeB to accommodate the use of such an identifier in resource allocation procedure without significant alterations to its operation. For example, the format of the identifier may correspond to a format of an identifier used to identify UEs in the system. In LTE systems the unique identifier may take the form of a C-RNTI that would conventionally be allocated to a UE for identification and resource allocation purposes. Use of a C-RNTI or other equivalent identifier allows the D2D communications link to be treated as a conventional UE with regards to resource allocation and thus enables the resource allocation to be transparent to legacy UEs. However, in order to differentiate between a UE derived C-RNTI and a D2D derived C-RNTI, a D2D derived C-RNTI may be referred to as a D-RNTI. In the case of LTE systems the D-RNTI may be selected from a predetermined set of RNTIs that may be reserved for association with D2D communications or generated from the properties of the link setup request. For example the generation of the D-RNTI may be based on the time of the D2D request and the requester identity.

Once a D-RNTI has been allocated to a D2D link, an indication of the identifier is communicated to the transmitting UE (UE1) and the receiving UE (UE2). This may for example be performed by including the D-RNTI in downlink control signaling (DCI) or transmitting it in resources of the PDSCH. Once the D-RNTI is known to UE1 and UE2 the D2D link may act in a substantially similarly to a conventional UE and the eNodeB may allocate resources as and when they are required/requested. When communicating the D-RNTI to UE2 it may be necessary to indicate that the D-RNTI relates to a D2D link or alternatively the UE may have knowledge of a predetermined set of D2D RNTIs or it may be assumed at UE2 that the reception of a second or further RNTI indicates that it is a D-RNTI. Along with the allocation of a D-RNTI, in some examples a link specific physical random access channel (PRACH) preamble and or a dedicated PUCCH resource may also be associated with the link/identifier and indicated to the requesting UE. This association may then enable the eNodeB to correctly associate an uplink resource request from UE1 with the D2D link. This therefore allows an eNodeB to initially identify a D2D resource request by the characteristics of the request transmission and for the D2D uplink request from UE1 to be performed in a manner that corresponds to a standard UE uplink request.

S505

Once the D-RNTI or similar identifier has been allocated to the D2D link, UE1 may then request resources for transmitting over the D2D link by requesting that uplink resources be allocated in association with the D-RNTI. For example, when UE1 wishes to transmit data to UE2, UE1 may request resources of the PUSCH of interface via an uplink request transmission to the eNodeB. A D2D uplink request may be made using a UCI transmission of a new or existing format, an allocated preamble or in a dedicated PUCCH resource. However, in some examples an uplink request including an indication of the identifier may be made in the PUSCH subsequent to an uplink resource request associated with UE1 itself (C-RNTI) rather than the D-RNTI. Although this may require increased signaling to identify the D-RNTI, it may conserve preamble and PUCCH resources and thus be of benefit in a congested system. Once an uplink request associated with the D-RNTI is received at the eNodeB, the eNodeB will then allocate resources of the wireless access interface to the D-RNTI. The allocated resources may be in any available resources of the wireless access interface as described above, but in LTE systems it is likely to be in the PUSCH. The D2D resource request may include an indication of the quantity of data to be transmitted by the requesting UE or a standard predetermined resource allocation may be given in response to a D2D resource request.

S506, 507

Figure 6:
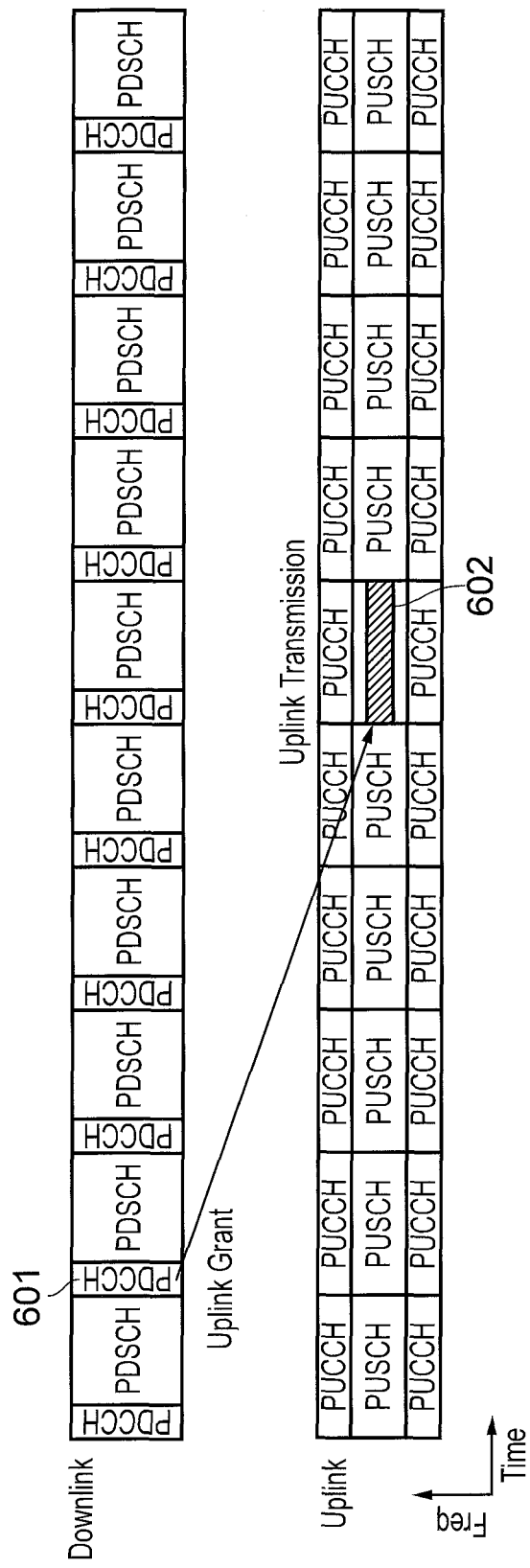
FIG. 6 provides a schematic diagram of the structure of a downlink and of an uplink of a wireless access interface in which resources are allocated to device-to-device communications.

Once an uplink request has been received from UE1 and resources allocated to the D2D link or associated with the identifier, the eNodeB then communicates an indication of the resource allocation to UE1 and UE2. This may be performed via the transmission of a DCI of an appropriate format where the CRC of the DCI is scrambled with the D-RNTI associated with link. In this manner UE1 and UE2, which both have knowledge of the D-RNTI, can detect the relevant DCI by correctly descrambling the CRC and extracting the indication of the resource allocation in which the D2D transmission is to take place. This process is illustrated in FIG. 6 where the DCI is transmitted in the PDCCH 601 and the DCI indicates the resource allocation in the PUSCH 602.

S508

Once UE1 has knowledge of the resource allocation it may then transmit the data intended for UE2 and UE2 can receive the data directly from UE1 in resources indicated by the DCI.

In the examples described above it is envisaged that a unique identifier is allocated to a one-way D2D link (i.e. UE1 to UE2) such that if a return link is desired a separate setup procedure will be required to be initiated by UE2 and a new identifier assigned to the UE2 to UE1 D2D link. The allocation of a unique identifier to only one direction of a link may increase the number of identifiers required in total but may simplify the operation of the D2D resource request procedure. For example, if one-way link identifiers are utilised it is not required to indicate which UE has transmitted a resource request because only a single transmitting UE is associated with the link identifier. However, in the case of two-way link additional signaling would be required in order to identify which UE transmitted the resource request. A second advantage of associating unique identifiers to a one-way link is that it is analogous to the manner in which resources are allocated to conventional UEs in an LTE system, where a resource request from a UE unambiguously identifies the UE which is requesting resources. Furthermore, it is also not required that UEs which receive a resource allocation associated with a link determine whether they are to transmit or receive data over the resources.

A number of advantages arise from the previously described D2D communications link procedure compared to alternative D2D resource allocation techniques. For example, it has previously been proposed that once a recipient UE has been identified, in order to perform a D2D transmission an initiating UE simply transmits a request for resources and then transmits in the subsequently allocated PUSCH resources whilst the receiving UE does receive any prior warning of the transmission. In such a case, in order for the receiving UE to correctly identify relevant D2D transmissions, a header is included which identifies the intended recipient. Although this approach may obviate the need for a link setup request message and the allocation of a unique identifier to the D2D link, because potential recipient UEs are unaware of the timing of the transmission of data they may be required to continuous monitor the resource (PUSCH) in which D2D data may be transmitted in order to detect data intended for it. Even if the resources in which D2D transmissions may be performed are small, a D2D capable UE will be required to monitor all D2D resources even when data is not transmitted, thus leading to increased power consumption at a D2D UE compared to the use of the presently disclosed technique. Furthermore, as the link setup request is required once for each D2D link, it may represent only a small overhead if a large number of transmissions occur across the D2D link.

A further advantage of the presently disclosed approach may also arise in an LTE system. Legacy UEs that may not be capable of D2D communications may experience compatibility issues if a new form of identifier is used for resource allocation D2D links. However, by using an RNTI based identifier the allocation of resources to D2D links will appear to be standard UE resource allocations and therefore transparent to legacy UEs. This therefore enables D2D communications links to operate simultaneously alongside convention LTE communications.

In further examples of the presently disclosed technique, a timer may be associated with each identifier whereby if an uplink resource request corresponding to a particular identifier is not received for the duration of the timer, the identifier is disassociated with the D2D link. If an uplink request is received then the timer may be reset. Timers of this nature may help ensure that allocation of identifiers is prioritized for more recent D2D link setup requests which may be advantageous if there are a finite number of identifiers available, which may be the case for RNTIs in LTE systems. Efficient use of identifiers may also be assisted by disassociating identifiers from a links where the transmitter or sole recipient of the link is no longer connected to the eNodeB.

In the previously discussed examples a unique identifier such as a D-RNTI has been allocated to a one-way one-to-one D2D communications link. Consequently, it may not be possible for a UE to simultaneously perform a D2D transmission to multiple UEs and thus a plurality of individual transmissions may be required in order to perform a one-to-many transmission. However, in other examples an identifier may also be allocated to a one-to-many D2D communications link.

Figure 7:
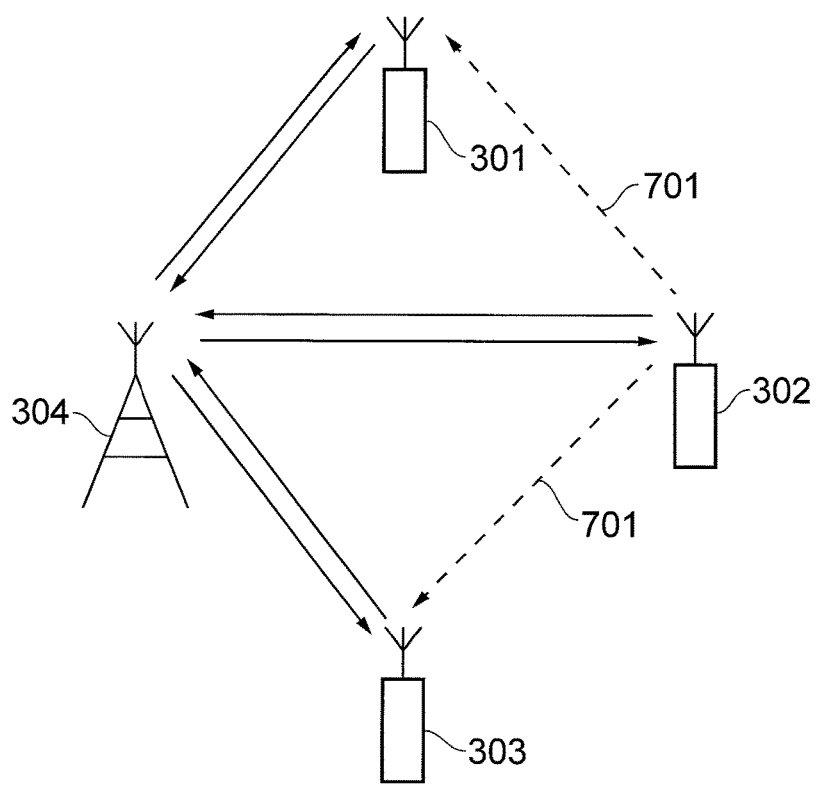
FIG. 7 provides a schematic diagram of a mobile communications system in which communications devices are operable to perform device-to-device communications.

FIG. 7 illustrates a communications system substantially similar to that described with reference to FIG. 3, however, UE 302 has established a one-to-many D2D link 701 between itself and UEs 301 and 303. The setup procedure for such a link will be substantially similar to that described above for a one-to-one link but the initiating UE will be required to identify multiple recipient UEs in the initial D2D link setup request. Once received at the eNodeB, the eNodeB will then allocate a single unique identifier to the one-to-many D2D link and communicate the identifier to the initiating UE and all the receiving UEs. The transmission of data over the D2D link will then be performed as previously described in steps S505 to S508 where resource allocations are communicated to all recipients by virtue of the fact that the multiple recipient UEs will be monitoring the PDCCH for DCI associated with the identifier.

In some examples D2D communications may be initiated by a serving eNodeB where the eNodeB instructs one or more UEs to perform D2D communications with one or more other UEs. In such an example an initial D2D link setup request and resource allocation request may not be required. This may occur for example in an LTE UE to UE distribution implementation where the serving eNodeB wishes to conserve PDSCH resources or PBCH resources by instructing UEs to distribute between themselves common information which has been initially distributed to a single UE from the eNodeB. In such a case an eNodeB may allocate a D-RNTI to each D2D distribution link across which it wishes the common data to be distributed and inform each of the transmitting and receiving UEs of each link the associated D-RNTI. The eNodeB may then transmit D2D resource allocations to the UEs in the PDCCH and the UEs would perform D2D communications of the common data in accordance with the resource allocations. As well as using eNodeB initiated D2D communications for common data, it may also be used for UE-to-UE distribution of data which is unique to individual UEs. For example, a UE may be configured to gather information from environmental sensors and then distribute the information to one or more other UEs. This process may be controlled by the eNodeB by setting up D2D links between the desired UEs and then initiating the D2D communication via the transmission of the resource allocations associated with D2D links in DCI associated with the link identifiers.

Up to this point the D2D communications have primarily been considered to occur within a communications system including a network entity or eNodeB, where the eNodeB coordinates the allocations of D2D link identifiers and the allocation of resources. However, in some examples a group of D2D capable UEs may be out of a coverage area of an eNodeB. In such a case one of the D2D capable UEs may act as a coordinating entity which receives requests for D2D links, allocates unique link identifiers and then allocates resources in a similar manner to that described above with reference to FIG. 5. Although the wireless access interface in such a system may be different to that provided by a dedicated network entity such as an eNodeB, the concept of allocating a UE identifier such as an RNTI to a D2D link remains along with the associated advantages. The above described procedure may also be implemented in a D2D group where a subset of the group are within a coverage area and but the remaining UEs are not. In such a scenario the coordinating UE may be required to perform D2D link set up and resource allocation in association with the eNodeB which is providing the coverage area.

Figure 8:
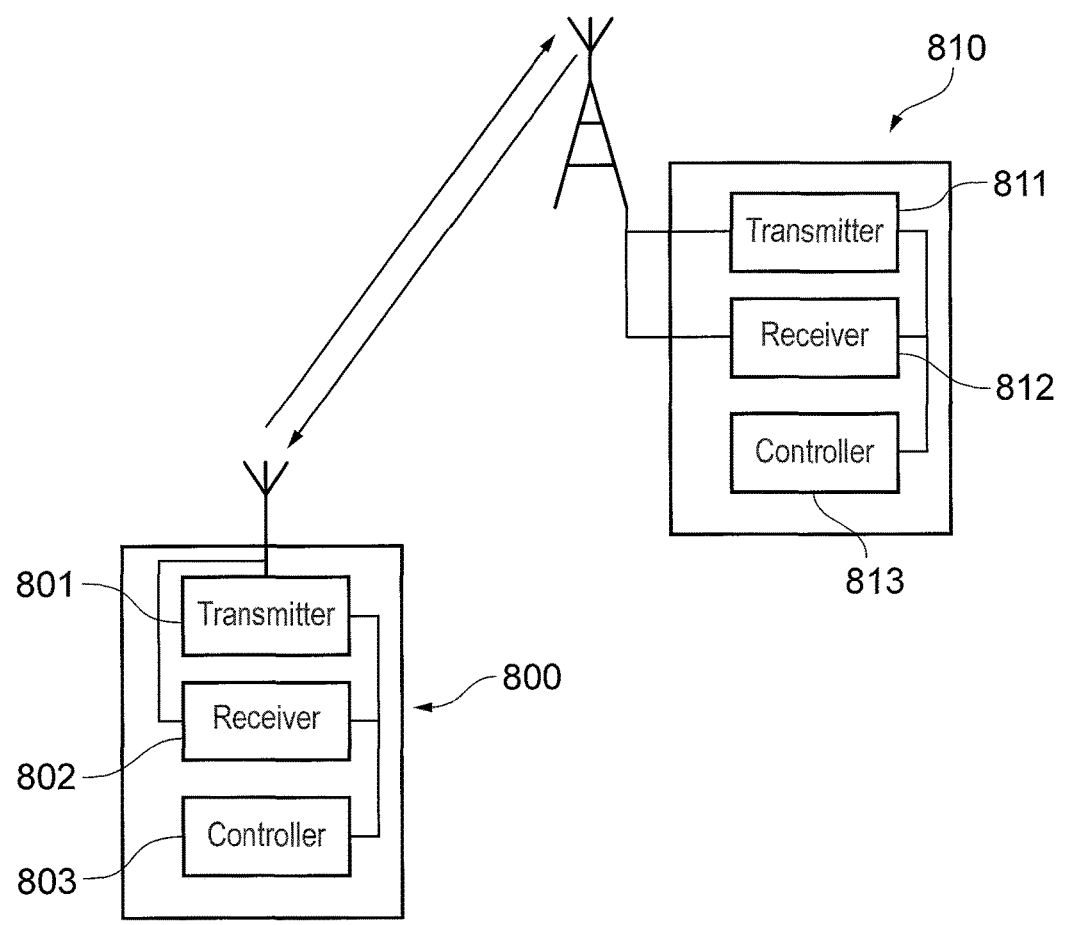
FIG. 8 provides a schematic diagram of a communications device and a network entity of a mobile communications system.

FIG. 8 provides a schematic diagram of a UE 800 and an eNodeB 810 in which examples of the presently disclosed technique may be implemented. The UE includes a transmitter 801, a receiver 802 and a controller 803 where the controller is configured to control the receiver 802 to detect signals representing control data and user data transmitted by the eNodeB 810, and to estimate the data conveyed by the signals. The controller 803 is also configured to control the transmitter 801 to transmit signals representing uplink control data and user data to the eNodeB. In examples where the UE 800 is capable of performing D2D communications, the controller is also configured to control the transmitter 801 and the receiver 802 to transmit and receive signals representing D2D control and user data to an from an eNodeB and other UEs. The UE 800 may also be configured to acts as a coordinating entity in a D2D group when members are out of coverage of an eNodeB. In such circumstances the controller 803 will be configured to control the transmitter 801 to transmit D2D control data as well as user data and also be configured to allocate identifiers to D2D communications links and allocate resources of the wireless access interface to D2D communications links. Although in FIG. 8 the UE 800 is illustrated as comprising a separate transmitter and receiver, it may instead comprise a transceiver which is configured in combination with the controller to implement the aforementioned features and techniques. The controller 803 may comprise a processor unit which is suitably configured/programmed to provide the desired functionality described herein using conventional programming/configuration techniques for equipment in wireless telecommunications systems. The transmitter 801, receiver 802 and controller 803 are schematically shown in FIG. 8 as separate elements for ease of representation. However, it will be appreciated the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the UE 800 will in general comprise various other elements associated with its operating functionality in accordance with established wireless telecommunications techniques (e.g. a power source, possibly a user interface, and so forth).

The eNodeB 810 includes a transmitter 811, a receiver 812 and a controller 813, where the controller 813 is configured to control the transmitter 811 to transmit signals representing control data and user data to UEs within a coverage area such as the UE 800, thus providing a wireless access interface to UEs within the coverage area. The controller 813 is also configured to control the receiver 813 to detect signals representing user control and uplink data and estimate the data conveyed by these signals. When D2D capable UEs are within the coverage area of the eNodeB 810 the controller 813 at the eNodeB may also acts as a coordinating entity thereby allocating identifiers to D2D communications links and allocating resources of the wireless access interface to D2D communications links. Although in FIG. 8 the eNodeB 810 is illustrated as comprising a separate transmitter and receiver, it may instead comprise a transceiver which is configured in combination with the controller to implement the aforementioned features and techniques at the eNodeB. The controller 813 may comprise a processor unit which is suitably configured/programmed to provide the desired functionality described herein using conventional programming/configuration techniques for equipment in wireless telecommunications systems. The transmitter 811, receiver 812 and controller 813 are schematically shown in FIG. 8 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the eNodeB 810 will in general comprise various other elements associated with its operating functionality in accordance with established wireless telecommunications techniques. For example, the eNodeB 810 will in general comprise a scheduling entity responsible for scheduling communications. The functionality of the scheduling entity may, for example, be subsumed by the controller 813.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The following numbered clauses provide further aspects and examples of the present disclosure:

1. A first communications device operable to transmit device-to-device communications to a second communications device using a wireless access interface of a wireless telecommunications system, access to the wireless access interface being coordinated by a coordinating entity, wherein the first communications device comprises a controller and a transceiver, the controller being configured in combination with the transceiver
    to receive from the coordinating entity an indication of an identifier associated with a device-to-device communications link between the first and second communications devices,
    to transmit to the coordinating entity a message requesting resources of the wireless access interface for transmitting data across the device-to-device communications link,
    to receive from the coordinating entity an indication of a resource allocation of the wireless access interface in association with an indication of the identifier, and
    to transmit the data to the second communications device using the allocated resources.
2. A first communications device according to clause 1, wherein the controller is configured in combination with the transceiver to transmit to the coordinating entity a message requesting an identifier to be associated with a device-to-device communications link with the second communications device.
3. A first communications device according to clauses 1 or 2, wherein the message requesting resources of the wireless access interface includes an indication of the identifier.
4. A first communications device according to any of clauses 1 to 3, wherein the identifier is associated with a one-way device-to-device communications link from the first communications device to the second communications device.
5. A first communications device according to any preceding clause, wherein the identifier associated with the device-to-device communications link has a format corresponding to a format for identifying communications devices in the wireless telecommunications system.
6. A first communications device according to any preceding clause wherein the first communications device is operable to transmit device-to-device communications to a plurality of second communications devices and the controller is configured in combination with the transceiver to receive from the coordinating entity an indication of an identifier associated with a plurality of device-to-device communications links between the first communications device and respective ones of the plurality of second communications devices.
7. A first communications device according to any preceding clause, wherein the controller is configured in combination with the transceiver to receive an indication of a preamble associated with the identifier from the coordinating entity, and to transmit the message requesting resources in association with the preamble.
8. A first communications device according to any preceding clause, wherein the controller is configured in combination with the transceiver to receive from the coordinating entity an indication of an uplink control channel resource of the wireless access interface associated with the identifier, and to transmit the message requesting resources in the uplink control channel resource.
9. A coordinating entity operable to coordinate access to a wireless access interface of a wireless telecommunications system and to coordinate device-to-device communications between a first communications device and a second communications devices using the wireless access interface, wherein the coordinating entity comprises a controller and a transceiver, the controller being configured in combination with the transceiver
    to associate an identifier with a device-to-device communications link between the first and second communications devices,
    to transmit an indication of the identifier to the first and second communications devices,
    to receive a message requesting resources of the wireless access interface from the first communications device for transmitting data across the device-to-device communications link,
    to allocate resources of the wireless access interface to the identifier associated with the device-to-device communications link in response to receiving the message requesting resources, and
    to transmit an indication of the resource allocation of the wireless access interface in association with an indication of the identifier to the first and second communications devices.
10. A coordinating entity according to clause 9, wherein the controller is configured in combination with the transceiver to associate the identifier with the device-to-device communications link in response to receiving from the first communications device a message requesting an identifier be associated with a device-to-device communications link with the second communications device.

11. A coordinating entity according to clauses 9 or 10, wherein the message requesting resources of the wireless access interface includes an indication of the identifier.

12. A coordinating entity according to any of clauses 9 to 11, wherein the identifier is associated with a one-way device-to-device communications link from the first communications device to the second communications device.

13. A coordinating entity according to any of clauses 9 to 12, wherein the identifier associated with the device-to-device communications link has a format corresponding to a format for identifying communications devices in the wireless telecommunications system.

14. A coordinating entity according to any of clauses 9 to 13, wherein the coordinating entity is a communications device operable to perform device-to-device communications.

15. A coordinating entity according to any of clauses 9 to 14, wherein the controller is configured to select the identifier to be associated with the device-to-device communications link from a predetermined group of identifiers reserved for association with device-to-device communications links.

16. A coordinating entity according to any of clauses 9 to 15, wherein the controller is configured in combination with the transceiver to associate a preamble with the identifier and transmit an indication of the preamble to the first communications device.

17. A coordinating entity according to any of clauses 9 to 16, wherein the controller is configured in combination with the transceiver to associate an uplink control channel resource of the wireless access interface with the identifier and transmit an indication of the uplink channel resource to the first communications device.

18. A second communications device operable to receive device-to-device communications from a first communications device using a wireless access interface of a wireless telecommunications system, access to the wireless access interface being coordinated by a coordinating entity, wherein the second communications device comprises a controller and a transceiver, the controller being configured in combination with the transceiver
to receive from the coordinating entity an indication of an identifier associated with a device-to-device communications link between the first and second communications devices,
to receive an indication from the coordinating entity of a resource allocation of the wireless access interface in association with an indication of the identifier, and
to receive data from the first communications device using the allocated resources.

19. A wireless telecommunications system comprising a first communications device and a second communications device, the first and the second communications devices being operable to perform device-to-device communications using a wireless access interface of the wireless telecommunications system, and a coordinating entity operable to coordinate access to the wireless access interface, wherein the coordinating entity comprises a controller and a transceiver configured in combination
to associate an identifier with a device-to-device communications link between the first and second communications devices,
to transmit an indication of the identifier to the first and the second communications devices,
to receive a message from the first communications device requesting resources of the wireless access interface for transmitting data across the device-to-device communications link,
to allocate resources of the wireless access interface to the identifier associated with the device-to-device communications link, and
to transmit an indication of the resource allocation in association with an indication of the identifier to the first and the second communications devices; the first communications device comprises a controller and a transceiver configured in combination
to receive the indication of the identifier from the coordinating entity,
to transmit the message requesting resources of the wireless access interface to the coordinating entity,
to receive the indication of the resource allocation from the coordinating entity, and
to transmit the data to the second communications device using the allocated resources; and the second communications device comprises a controller and a transceiver configured in combination
to receive the indication of the identifier from the coordinating entity,
to receive the indication of the resource allocation from the coordinating entity, and
to receive the data from the first communications device in the allocated resources.

20. A wireless telecommunications system according to clause 19, wherein the controller and the transceiver of the first communications device are configured in combination to transmit to the coordinating entity a message requesting an identifier to be associated with a device-to-device communications link with the second communications device, and the controller and the transceiver of the coordinating entity are configured in combination to associate the identifier in response to receiving the message requesting an identifier.

21. A wireless telecommunications system according to clauses 19 or 20, wherein the message requesting resources of the wireless access interface for transmitting data across the device-to-device communications link includes an indication of the identifier.

22. A wireless telecommunications system according to any of clauses 19 to 21, wherein the identifier is associated with a one-way device-to-device communications link from the first communications device to the second communications device.

23. A wireless telecommunications system according to any of clauses 19 to 22, wherein the identifier associated with the device-to-device communications link has a format corresponding to a format for identifying communications devices in the wireless telecommunications system.

24. A wireless telecommunications system according to any of clauses 19 to 23, wherein the system comprises a plurality of second communications devices and the first communications device is operable to perform device-to-device communications with respective ones of the plurality of second communications devices, and the controller of the coordinating entity is configured to associate the identifier with one or more device-todevice communications link between the first communications device and the plurality of second communications devices.
25. A wireless telecommunications system according to any of clauses 19 to 24, wherein the coordinating entity is a communications device operable to perform device-to-device communications.
26. A wireless telecommunications system according to any of clauses 19 to 25, wherein the controller of the coordinating entity is configured to select the identifier to be associated with the communications link from a predetermined group of identifiers reserved for association with device-to-device communications links.
27. A wireless telecommunications system according to any of clauses 19 to 26, wherein the controller and the transceiver of the coordinating entity are configured in combination to associate a preamble with the identifier and to transmit an indication of the preamble to the first communications device, and the controller and the transceiver of the first communications device are configured in combination to transmit the message requesting resources in association with the preamble.
28. A wireless telecommunications system according to any of clauses 19 to 27, wherein the controller and the transceiver of the coordinating entity are configured in combination to associate an uplink control channel resource with the identifier and transmit an indication of the uplink channel resource to the first communications device, and the controller and the transceiver of the first communications device are configured in combination to transmit the message requesting resources of the wireless access interface in the uplink control channel resource.
29. A method for transmitting device-to-device communications from a first communications device to a second communications device, the first communications device being operable to transmit device-to-device communications to a second communications device using a wireless access interface of a wireless telecommunications system, access to the wireless access interface being coordinated by a coordinating entity, wherein the method comprises
  receiving at the first communications device from the coordinating entity an indication of an identifier associated with a device-to-device communications link between the first and second communications devices,
  transmitting from the first communications device to the coordinating entity device a message requesting resources of the wireless access interface for transmitting data across the device-to-device communications link,
  receiving at the first communications device from the coordinating entity an indication of a resource allocation of the wireless access interface in association with an indication of the identifier, and
  transmitting the data from the first communications device to the second communications device using the allocated resources.
30. A method for coordinating device-to-device communications between a first communications device and a second communications device using a wireless access interface of a wireless telecommunications system, access to the wireless access interface being coordinated by a coordinating entity, wherein the method comprises
  associating at the coordinating entity an identifier with a device-to-device communications link between the first and second communications devices,
  transmitting from the coordinating entity to the first and second communications devices an indication of the identifier,
  receiving at the coordinating entity from the first communications device a message requesting resources of the wireless access interface for transmitting data across the device-to-device communications link,
  allocating at the coordinating entity resources of the wireless access interface to the identifier associated with the device-to-device communications link in response to receiving the message requesting resources, and
  transmitting from the coordinating entity to the first and second communications devices an indication of the resource allocation of the wireless access interface in association with an indication of the identifier.
31. A method for receiving device-to-device communication at a second communications device from a first communications device, the second communications device being operable to receive device-to-device communications from a first communications device using a wireless access interface of a wireless telecommunications system, access to the wireless access interface being coordinated by a coordinating entity, wherein the method comprises
  receiving at the second communications device from the coordinating entity an indication of an identifier associated with a device-to-device communications link between the first and second communications devices,
  receiving at the second communications device from the coordinating entity an indication of a resource allocation of the wireless access interface in association with an indication of the identifier, and
  receiving data at the second communications device from the first communications device using the allocated resources.
32. A method for performing device-to-device communications in a wireless telecommunications system, the wireless telecommunications system comprising first and second communications devices operable to perform device-to-device communications using a wireless access interface of the wireless telecommunications system, and a coordinating entity operable to coordinate access to the wireless access interface, wherein the method comprises
  associating at the coordinating entity an identifier with a device-to-device communications link between the first and second communications devices,
  transmitting from the coordinating entity to the first and second communications devices an indication of the identifier,
  transmitting from the first communications device to the coordinating entity a message requesting resources of the wireless access interface for transmitting data across the device-to-device communications link,
  allocating at the coordinating entity resources of the wireless access interface to the identifier associated with the device-to-device communications link,
  transmitting from the coordinating entity to the first and second communications devices an indication of the resource allocation in association with an indication of the identifier, and transmitting from the first communications device to the second communications device the data using the allocated resources.

33. Circuitry for a first communications device operable to transmit device-to-device communications to a second communications device using a wireless access interface of a wireless telecommunications system, access to the wireless access interface being coordinated by a coordinating entity, wherein the circuitry comprises a controller circuitry element and a transceiver circuitry element configured to operate together to cause the first communications device
   to receive from the coordinating entity an indication of an identifier associated with a device-to-device communications link between the first and second communications devices,
   to transmit to the coordinating entity a message requesting resources of the wireless access interface for transmitting data across the device-to-device communications link,
   to receive from the coordinating entity an indication of a resource allocation of the wireless access interface in association with an indication of the identifier, and
   to transmit the data to the second communications device using the allocated resources.

34. Circuitry for a coordinating entity operable to coordinate access to a wireless access interface of a wireless telecommunications system and to coordinate device-to-device communications between a first communications device and a second communications devices using the wireless access interface, wherein the circuitry comprises a controller circuitry element and a transceiver circuitry element configured to operate together to cause the coordinating entity
   to associate an identifier with a device-to-device communications link between the first and second communications devices,
   to transmit an indication of the identifier to the first and second communications devices,
   to receive a message requesting resources of the wireless access interface from the first communications device for transmitting data across the device-to-device communications link,
   to allocate resources of the wireless access interface to the identifier associated with the device-to-device communications link in response to receiving the message requesting resources, and
   to transmit an indication of the resource allocation of the wireless access interface in association with an indication of the identifier to the first and second communications devices.

35. Circuitry for a second communications device operable to receive device-to-device communications from a first communications device using a wireless access interface of a wireless telecommunications system, access to the wireless access interface being coordinated by a coordinating entity, wherein the circuitry comprises a controller circuitry element and a transceiver circuitry element configured to operate together to cause the second communications device
   to receive from the coordinating entity an indication of an identifier associated with a device-to-device communications link between the first and second communications devices,
   to receive an indication from the coordinating entity of a resource allocation of the wireless access interface in association with an indication of the identifier, and
   to receive data from the first communications device using the allocated resources.

36. A wireless telecommunications system as substantially hereinbefore described with reference to the accompanying drawings.

37. A communications device as substantially hereinbefore described with reference to the accompanying drawings.

38. A coordinating entity as substantially hereinbefore described with reference to the accompanying drawings.

REFERENCES

[1] LTE for UMTS: OFDMA and SC-FDMA Based Radio Access, Harris Holma and Antti Toskala, Wiley 2009, ISBN 978-0-470-99401-6.

The invention claimed is:

1. A first communications device operable to transmit device-to-device communications to a second communications device using a wireless access interface of a wireless telecommunications system, access to the wireless access interface being coordinated by a coordinating entity, the first communications device comprising:
   a controller and a transceiver, the controller being configured in combination with the transceiver to:
      receive, from the coordinating entity, a first indication of an identifier associated with a device-to-device communications link between the first and second communications devices;
      receive, from the coordinating entity, a second indication of an uplink control channel resource of the wireless access interface associated with the identifier;
      transmit, to the coordinating entity in response to the second indication, a message in the uplink control channel resource requesting resources of the wireless access interface for transmitting data across the device-to-device communications link;
      receive, from the coordinating entity, a third indication of a resource allocation of the wireless access interface in association with the first indication of the identifier; and
      transmit the data to the second communications device using the allocated resources.

2. The first communications device as claimed in claim 1, wherein the controller is configured in combination with the transceiver to transmit to the coordinating entity a request message requesting the identifier to be associated with a device-to-device communications link with the second communications device.

3. The first communications device as claimed in claim 1, wherein the message requesting resources of the wireless access interface includes the first indication of the identifier.

4. The first communications device as claimed in claim 1, wherein the identifier is associated with a one-way device-to-device communications link from the first communications device to the second communications device.

5. The first communications device as claimed in claim 1, wherein the identifier associated with the device-to-device communications link has a format corresponding to a format for identifying communications devices in the wireless telecommunications system.

6. The first communications device as claimed in claim 1, wherein the first communications device is operable to transmit device-to-device communications to a plurality of second communications devices, and the controller is configured in combination with the transceiver to receive, from the coordinating entity, an indication of the identifier associated with a plurality of device-to-device communications links between the first communications device and respective ones of the plurality of second communications devices.

7. The first communications device as claimed in claim 1, wherein the uplink control channel resource is at least one of a specific physical random access channel (PRACH) preamble and a dedicated physical uplink control channel (PUCCH) resource associated with the device-to-device communications link between the first and second communications devices.

8. The first communications device as claimed in claim 1, wherein the uplink control channel resource is a specific physical random access channel (PRACH) preamble associated with the device-to-device communications link between the first and second communications devices.

9. The first communications device as claimed in claim 1, wherein the uplink control channel resource is a dedicated physical uplink control channel (PUCCH) resource associated with the device-to-device communications link between the first and second communications devices.

10. The first communications device as claimed in claim 1, wherein the uplink control channel resource is not associated with an identifier of the first communications device.

11. A coordinating entity operable to coordinate access to a wireless access interface of a wireless telecommunications system and to coordinate device-to-device communications between a first communications device and a second communications devices using the wireless access interface, the coordinating entity comprising:
   a controller and a transceiver, the controller being configured in combination with the transceiver to:
     associate an identifier with a device-to-device communications link between the first and second communications devices;
     associate an uplink control channel resource of the wireless access interface with the identifier;
     transmit a first indication of the identifier to the first and second communications devices;
     transmit a second indication of the uplink control channel resource to the first communications device;
     receive, from the first communications device in response to the second indication, a message requesting resources of the wireless access interface for transmitting data across the device-to-device communications link;
     allocate resources of the wireless access interface to the identifier associated with the device-to-device communications link in response to receiving the message requesting resources; and
     transmit, to the first and second communication devices, a third indication of the resource allocation of the wireless access interface in association with the first indication of the identifier.

12. The coordinating entity as claimed in claim 11, wherein the controller is configured in combination with the transceiver to associate the identifier with the device-to-device communications link in response to receiving, from the first communications device, a request message requesting the identifier be associated with a device-to-device communications link with the second communications device.

13. The coordinating entity as claimed in claim 11, wherein the message requesting resources of the wireless access interface includes the first indication of the identifier.

14. The coordinating entity as claimed in claim 11, wherein the identifier is associated with a one-way device-to-device communications link from the first communications device to the second communications device.

15. The coordinating entity as claimed in claim 11, wherein the identifier associated with the device-to-device communications link has a format corresponding to a format for identifying communications devices in the wireless telecommunications system.

16. The coordinating entity as claimed in claim 11, wherein the coordinating entity is a communications device operable to perform device-to-device communications.

17. The coordinating entity as claimed in claim 11, wherein the controller is configured to select the identifier to be associated with the device-to-device communications link from a predetermined group of identifiers reserved for association with device-to-device communications links.

18. A method for transmitting device-to-device communications from a first communications device to a second communications device, the first communications device being operable to transmit device-to-device communications to a second communications device using a wireless access interface of a wireless telecommunications system, access to the wireless access interface being coordinated by a coordinating entity, the method comprising:
   receiving, by the first communications device from the coordinating entity, a first indication of an identifier associated with a device-to-device communications link between the first and second communications devices;
   receiving, by the first communications device from the coordinating entity, a second indication of an uplink control channel resource of the wireless access interface associated with the identifier;
   transmitting, by the first communications device to the coordinating entity device in response to the second indication, a message in the uplink control channel resource requesting resources of the wireless access interface for transmitting data across the device-to-device communications link;
   receiving, by the first communications device from the coordinating entity, a third indication of a resource allocation of the wireless access interface in association with the first indication of the identifier; and
   transmitting, by the first communications device to the second communications device, the data using the allocated resources.

19. Circuitry for a first communications device operable to transmit device-to-device communications to a second communications device using a wireless access interface of a wireless telecommunications system, access to the wireless access interface being coordinated by a coordinating entity, the circuitry comprising:
   a controller circuitry element and a transceiver circuitry element configured to operate together to:
     receive, from the coordinating entity, a first indication of an identifier associated with a device-to-device communications link between the first and second communications devices;
     receive, from the coordinating entity, a second indication of an uplink control channel resource of the wireless access interface associated with the identifier;

transmit, to the coordinating entity in response to the second indication, a message in the uplink control channel resource requesting resources of the wireless access interface for transmitting data across the device-to-device communications link;

receive, from the coordinating entity, a third indication of a resource allocation of the wireless access interface in association with the first indication of the identifier; and transmit the data to the second communications device using the allocated resources.

20. A first communications device operable to transmit device-to-device communications to a second communications device using a wireless access interface of a wireless telecommunications system, access to the wireless access interface being coordinated by a coordinating entity, the first communications device comprising:

circuitry and a transceiver, the circuitry being configured in combination with the transceiver to:

receive, from the coordinating entity, a first indication of an identifier associated with a device-to-device communications link between the first and second communications devices;

receive, from the coordinating entity, a second indication of an uplink control channel resource of the wireless access interface associated with the identifier;

transmit, to the coordinating entity in response to the second indication, a message in the uplink control channel resource requesting resources of the wireless access interface for transmitting data across the device-to-device communications link;

receive, from the coordinating entity, a third indication of a resource allocation of the wireless access interface in association with the first indication of the identifier; and transmit the data to the second communications device using the allocated resources.

* * * * *